(12) United States Patent
Bourcier et al.

(10) Patent No.: US 6,571,041 B2
(45) Date of Patent: May 27, 2003

(54) METHOD AND APPARATUS FOR POSITIONING OPTICAL ELEMENTS

(75) Inventors: Roy J. Bourcier, Corning, NY (US);
Dominick J. Forenz, Hammondsport, NY (US); Merle G. Thompson, Jr., Covington, PA (US); Tina N. Redcay, Covington, PA (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/920,986

(22) Filed: Aug. 2, 2001

(65) Prior Publication Data

US 2003/0026548 A1 Feb. 6, 2003

(51) Int. Cl.[7] ................................. G02B 6/36
(52) U.S. Cl. ......................... 385/52; 385/88; 385/91; 359/822
(58) Field of Search ...................... 385/52; 359/822

(56) References Cited

U.S. PATENT DOCUMENTS

| | | | | |
|---|---|---|---|---|
| 4,714,214 A | * | 12/1987 | Schleimann-Jensen et al. | 244/3.15 |
| 5,138,496 A | * | 8/1992 | Pong | 327/544 |
| 5,301,251 A | * | 4/1994 | Moore et al. | 385/88 |
| 5,570,444 A | | 10/1996 | Janssen et al. | 385/90 |
| 6,115,166 A | * | 9/2000 | Kotaki | 359/212 |
| 6,201,644 B1 | * | 3/2001 | Sakata et al. | 359/618 |
| 2002/0037142 A1 | | 3/2002 | Rossi | 385/92 |
| 2002/0181839 A1 | * | 12/2002 | Brown et al. | 385/16 |

FOREIGN PATENT DOCUMENTS

WO    WO 93/23800    11/1993

* cited by examiner

Primary Examiner—John D. Lee
Assistant Examiner—Daniel Valencia
(74) Attorney, Agent, or Firm—James V. Suggs; Eric M. Smith (57) ABSTRACT

One aspect of the present invention is a positioner for an optical element. The positioner includes a base having a receptacle and a substantially planar surface slidably engageable with a substrate. The positioner also includes a mounting platform disposed in the receptacle. The receptacle constrains the mounting platform to translation in a direction substantially perpendicular to the substantially planar surface and the mounting platform is configured so as to be free to rotate about three orthogonal axes within the receptacle. The optical element is coupled to the mounting platform. The optical element is aligned with a second optical element by selectively positioning the mounting platform.

40 Claims, 10 Drawing Sheets

METHOD AND APPARATUS FOR POSITIONING OPTICAL ELEMENTS

BACKGROUND OF THE INVENTION

1. Field of the Invention

The present invention relates generally to optical positioners, and particularly to a positioning device for optical elements.

2. Technical Background

The alignment and structural attachment of miniature photonic components is a difficult technical problem. Many optical devices have optical tolerances that are large enough to allow the devices to be passively aligned with on another. In passive alignment optical elements are attached either to one another or to a substrate in predetermined locations. Active alignment is required for optical devices having closer optical tolerances. Active alignment is the process of placing an optical element in a desired location by perturbing its location while monitoring the impact of the perturbation on an optical signal. The optical element is repositioned until the optical signal achieves a desired value, e.g., insertion loss is minimized, or a certain waveband of light is transmitted or reflected.

Active alignment of optical elements is used in the construction of numerous optical devices in optical communication systems. Examples of which are alignment of filters in wavelength add/drop multiplexers, aligning lens with light sources, aligning collimators with one another, and optical waveguide fibers with optical devices such as planar optical circuits and active devices.

The active alignment of optical devices is complicated by the fact that after the optical element is positioned it must be fixed into place. During the operation of fixing the optical element in place the optical element must be free of unacceptable shifts in position. Positional shifts may occur in the positional fixing portion of the assembly process, for example, during the cure cycle of a thermally curable adhesive, due to the contraction or expansion of the adhesive.

SUMMARY OF THE INVENTION

The present invention facilitates the active alignment of optical elements by allowing for their manipulation in six degrees of freedom.

One aspect of the present invention is a positioner for an optical element. The positioner includes a base having a receptacle and a substantially planar surface slidably engageable with a substrate. The positioner also includes a mounting platform disposed in the receptacle. The receptacle constrains the mounting platform to translation in a direction substantially perpendicular to the substantially planar surface and the mounting platform is configured so as to be free to rotate about three orthogonal axes within the receptacle. The optical element is coupled to the mounting platform. The optical element is aligned with a second optical element by selectively positioning the mounting platform.

In another aspect, the present invention includes a positioner for an optical element. The positioner includes a base having a substantially planar surface slidably engageable with a substrate. The base also includes two vertical members. Each vertical member includes an arcuate surface and a slot. The arcuate surfaces of the two vertical members define a receptacle. A mounting platform is disposed within the receptacle. The mounting platform includes a curved surface. The curved surface allows the mounting platform to be selectively positionable by allowing the mounting platform to slide and rotate within the receptacle. The optical element is mounted to the mounting platform and is positioned by sliding and rotating the mounting platform within the receptacle and sliding the base on the substrate. After the optical element is positioned the mounting platform is coupled to the base and the base is coupled to the substrate.

In another aspect, the present invention includes a positioner for an optical element. The positioner includes a base slidably moveable on a surface. The base includes a substantially cylindrical receptacle. The positioner also includes a mounting platform disposed within the receptacle. The mounting platform includes an arcuate surface and is selectively positionable within the receptacle. The optical element is coupled to the mounting platform and is aligned with another optical element by translating and rotating the mounting platform within the receptacle and sliding the base on the surface, thus providing an alignment system with six degrees of freedom. After the optical elements are aligned the mounting platform is coupled to the base and the base is coupled to the surface.

In another aspect, the present invention includes a method for positioning an optical element. The method includes the steps of providing an optical element, the optical element having an optical axis and providing a mounting platform. The method further includes the step of coupling the optical element to the mounting platform. The method further includes the steps of providing a base, the base having a receptacle and placing the mounting platform in the receptacle, thereby forming an assembly. The method further includes the steps of placing the assembly on a surface and aligning the optical element in accordance with predetermined criteria. The method further includes the steps of coupling the assembly to the surfaces and coupling the mounting platform to the base. Wherein the step of aligning includes the steps of translating the assembly along the surface, translating the mounting platform within the receptacle and rotating the mounting platform within the receptacle.

The positioner for optical elements of the present invention results in a number of advantages over prior art positioners for optical elements. For example the positioner for optical elements of the present invention does not rely on non-elastic deformation of the positioner to maintain the alignment of optical elements.

Another advantage of the present invention is that the present invention may be used with robotic assembly systems thereby allowing the positioning of optical elements with great precision.

Another advantage of the present invention is that optical elements may be aligned and attached in a single assembly step, enabling automated assembly of optical devices.

Another advantage of the present invention is that the optical element being aligned is permanently fixed to the optical platform, ensuring the position and orientation of each optical element relative to other optical elements is maintained.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the positioner of the present invention is shown in FIG. 1, and is designated generally throughout by reference numeral 10.

In accordance with the invention, the present invention for a positioner 10 for an optical element 11 includes a base 12 and a mounting platform 14.

Figure 1:
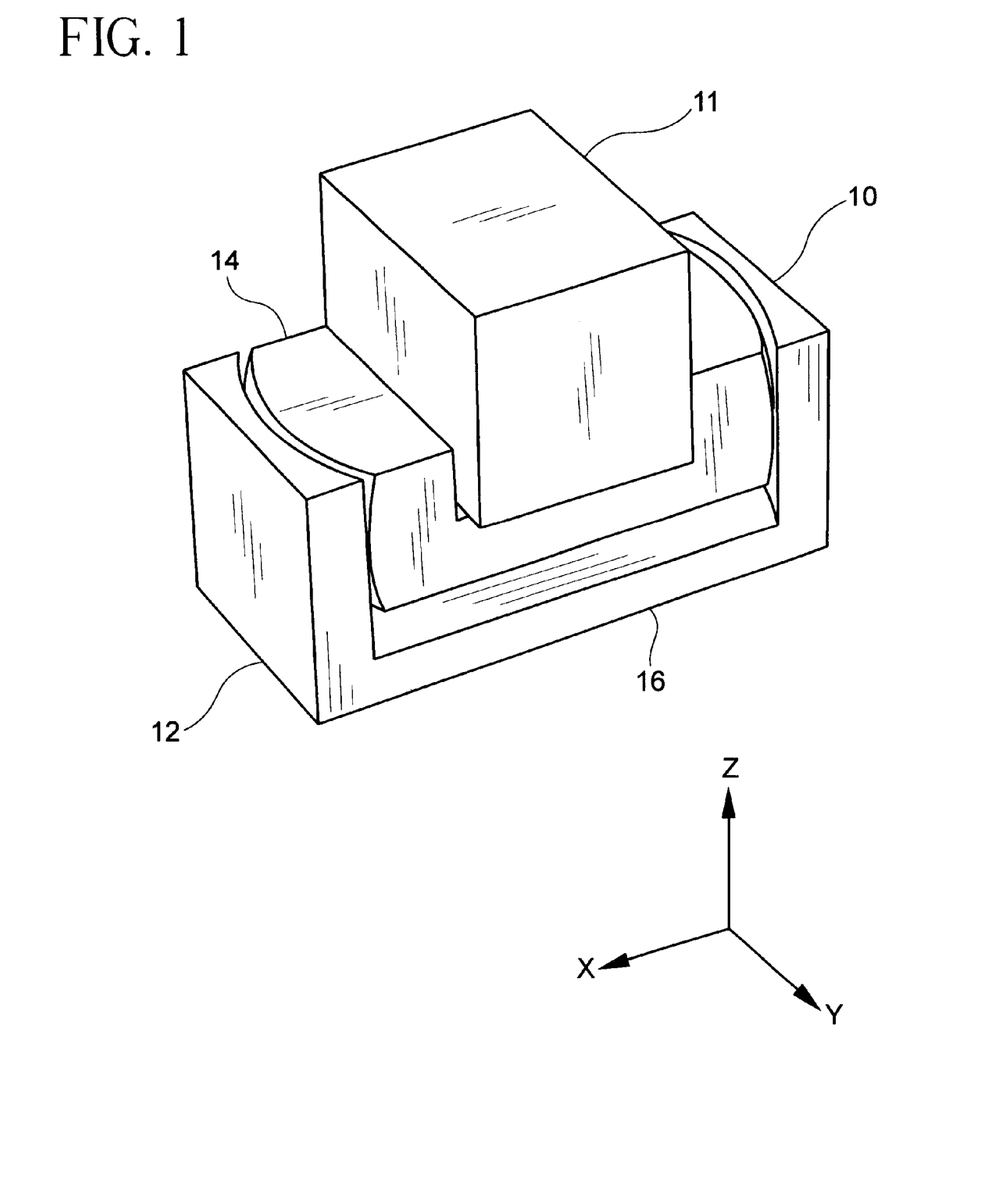
FIG. 1 is a perspective view of a positioner in which the present invention is embodied.

As embodied herein and shown in FIG. 1, the optical element 11 is coupled to the mounting platform 14. The optical element 11 may be for example, a laser, a laser diode, a lens, a micro-lens, an integrated optical module, an optical waveguide fiber, a bundle of optical waveguide fibers, a diffractive optical element, a detector, a photodetector, a sensor, a filter, a thin film device, a mirror or a screen. It will be apparent to those of ordinary skill in the pertinent art that the preceding list is illustrative of the versatility and adaptability of the present invention to the mounting of optical elements and is not a limitation on the type of optical elements that may be positioned utilizing the present invention.

The base 12 includes a planar surface 16. The planar surface 16 allows the base 12 to be positioned anywhere on a flat surface, such as, for example, an interior surface of an optical device or package. A specific example of which is the interior floor of a pump laser package. The planar surface 16 therefore allows reciprocal lineal motion of the positioner 10 along two orthogonal axes as shown by arrows 18 and 20 in FIG. 2, thus providing two translational degrees of freedom.

Figure 3:
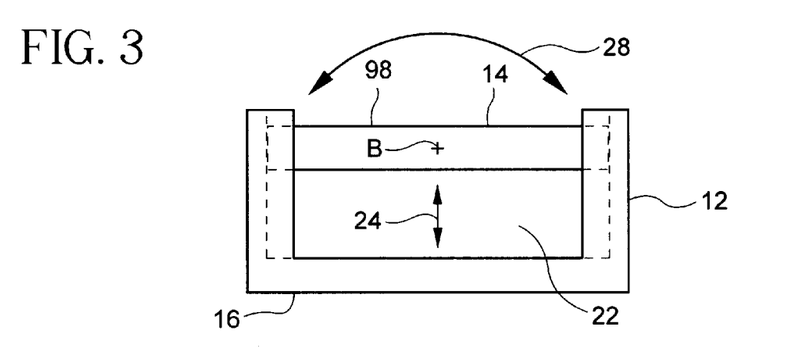
FIG. 3 is a front elevation view of the positioner shown in FIG. 1.

Returning to FIG. 1, the base 12 also defines a receptacle 22 configured to receive the mounting platform 14. The receptacle 22 may be formed, for example, by removing a cylindrical volume from the base 12; this may be accomplished by boring a stopped hole into the base 12. As will be appreciated by those skilled in the art, the base 12 may be made by a number of methods, such as, for example, casting, machining, injection molding, forming the article from sheet metal or assembling the base 12 from separate components. Turning to FIG. 3, mounting platform 14 is shown within the receptacle 22. Preferably, the receptacle 22 substantially limits the translational movement of the mounting platform 14 to reciprocal lineal motion, as indicated by the arrow 24, along an axis inclined with respect to the planar surface 16. More preferably, the receptacle 22 limits the translational movement of the mounting platform to movement perpendicular to the planar surface 16 of the base 12. This gives the positioner 10 its third degree of translational freedom. Returning to FIG. 1, when the receptacle 22 constrains the translation of the mounting platform 14 to a movement along an axis perpendicular to the planar surface 16 movement in the Z direction is decoupled from movement in the X and Y directions. It will be apparent to those of ordinary skill in the pertinent art that modifications to the configuration of the receptacle may change the orientation of the translation of the mounting platform 14 with respect to the planar surface 14, such as, for example configuring the receptacle 22 so that translation of the mounting platform 14 within the receptacle 22 results in movement of the mounting platform 14 in the both the Z and X directions the or both the Z and Y directions or in the X, Y and Z directions.

It will be apparent to those of ordinary skill in the pertinent art that modifications and variations can be made to the base 12 of the present invention, such as, for example the alternate embodiments of the base 12 shown in FIGS. 5, 6, 7 and 8.

Figure 5:
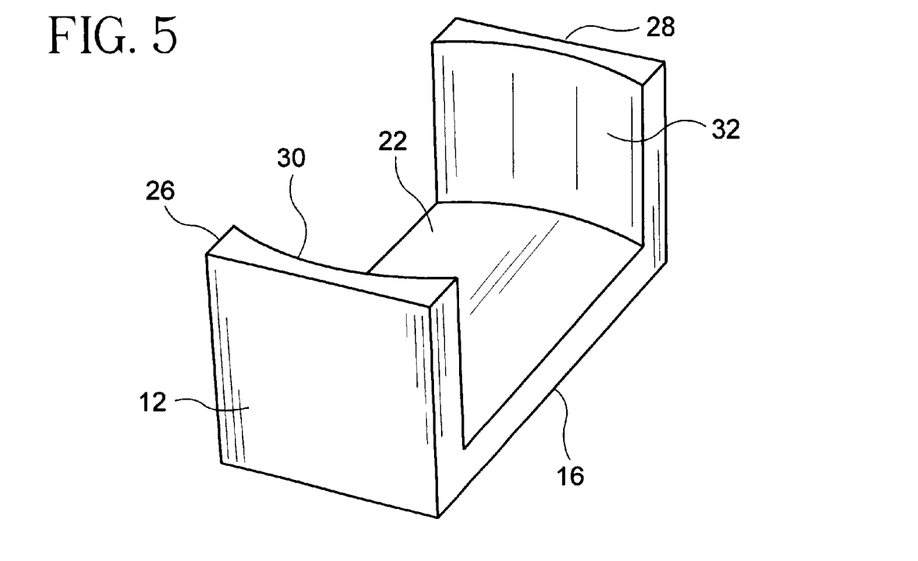
FIG. 5 is a perspective view of an embodiment of the base of the present invention.

FIG. 5 shows a base 12 having two vertical members 26, 28. Each of the vertical members 26, 28 has an arcuate surface 30, 32. The base 12 also includes a surface 16 configured for slidable engagement with a planar surface, such as, for example the surface of an optical platform (not shown). Preferably the arcuate surfaces 30, 32 have the same radius of curvature and if extended until they contacted one another would define a cylindrical volume having a longitudinal axis perpendicular to the planar surface 16. The arcuate surfaces 30, 32 define the receptacle 22. Preferably the arcuate surfaces 30, 32 all have the same radius of curvature and if extended until they contacted one another would define a cylindrical volume having a longitudinal axis perpendicular to the planar surface 16. As previously described, the receptacle 22 receives the mounting platform 14. The arcuate surfaces 30, 32 limit the lineal motion of the mounting platform 14 to the direction shown by the arrow 24 in FIG. 3. The mounting platform 14 is free to rotate about 3 orthogonal axes within the receptacle 22. It will be appreciated by those skilled in the art, that the amount of rotation of the mounting platform 14 about each of the three orthogonal axes is limited by the specific configuration of the receptacle 22 and the mounting platform 14.

Figure 10:
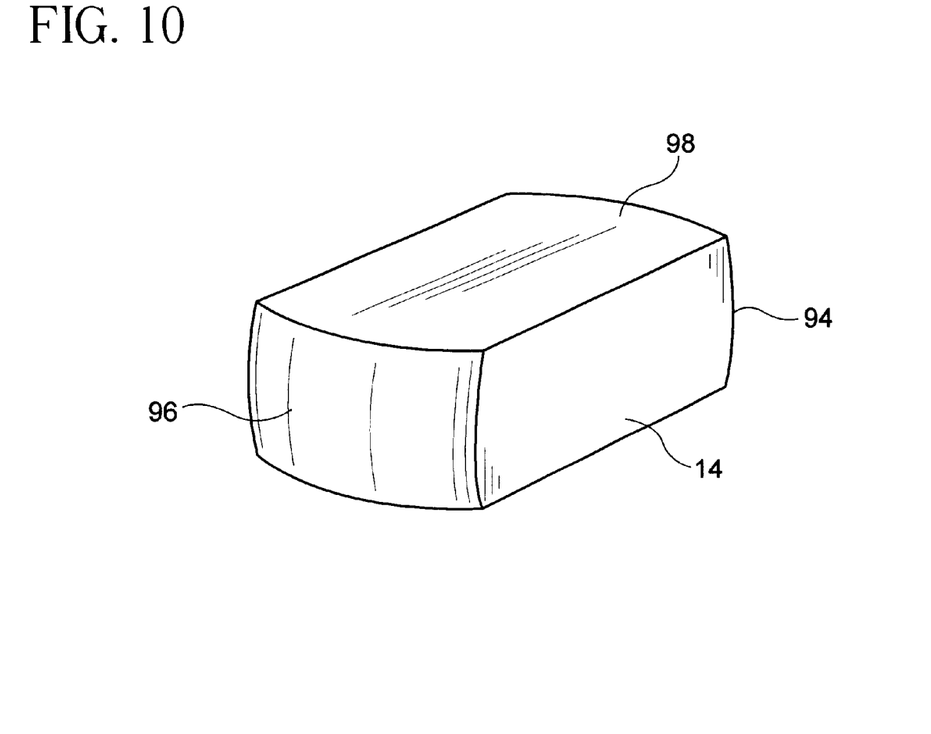
FIG. 10 is a perspective view of the mounting platform shown in FIG. 1.

As embodied herein and depicted in FIG. 10, the mounting platform 14 includes to arcuate surfaces 94, 96 and a mounting surface 98. Each of the arcuate surfaces 94, 96 possesses compound curvature and has substantially identical radii of curvature. The arcuate surfaces 94, 96 are sized to allow the mounting platform 14 to rotate about three orthogonal axes within the receptacle 16. Preferably, the arcuate surfaces 94, 96 are spherical surfaces, such as may be obtained by machining a precision spherical bearing to form the mounting platform depicted in FIG. 10.

Figure 12:
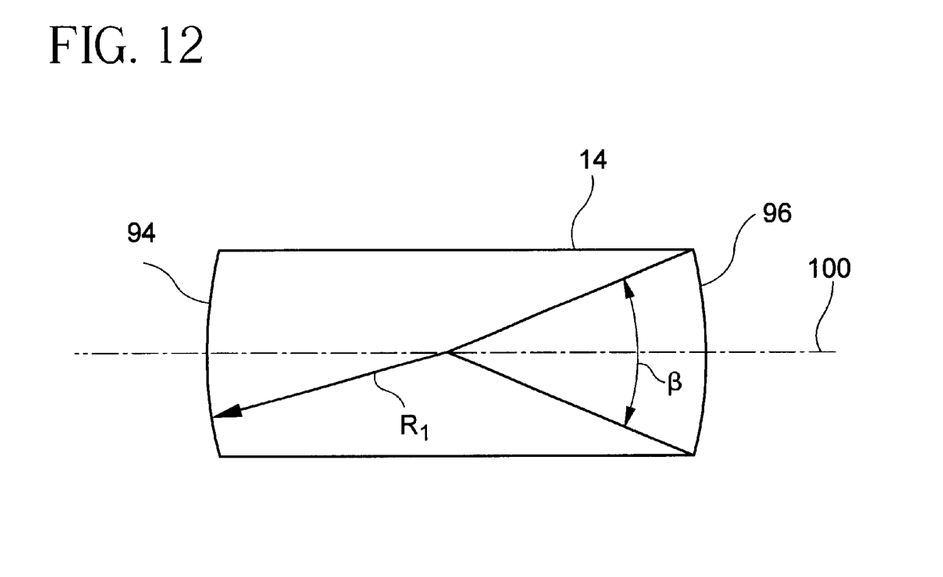
FIG. 12 is a top plan view of the mounting platform shown in FIG. 10.
Figure 13:
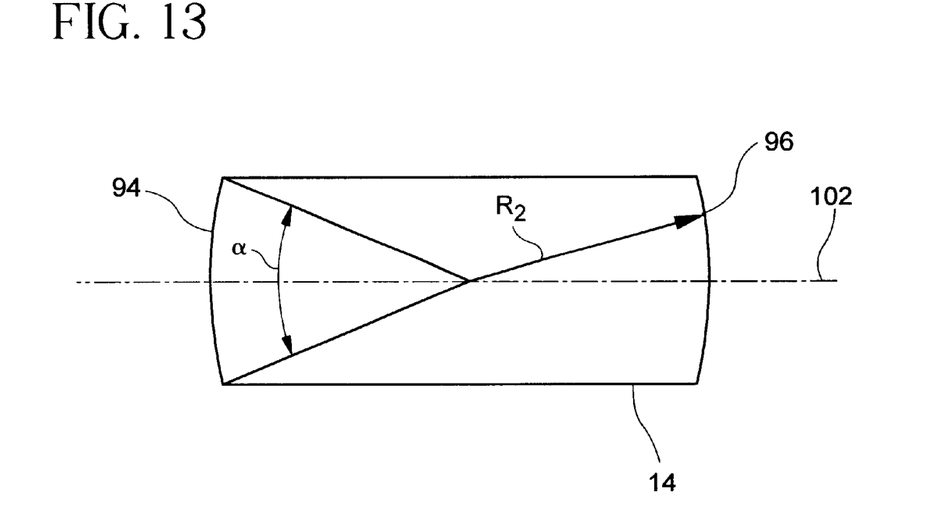
FIG. 13 is a front elevation view of the mounting platform shown in FIG. 10.

FIG. 12 and FIG. 13 are, respectively, a top plan view and a front elevation view of one possible embodiment of the mounting platform 14. In the top plan view of FIG. 12, the arcuate surfaces 94, 96 are symmetric about a midplane 100 and subtend an angle β. The actual value of the angle β will depend upon the design constraints of the particular installation. Values of β that have proven useful range from about 30 degrees to about 90 degrees. The arcuate surfaces 94, 96 have a radius $R_1$ when viewed from the top. It will be appreciated that although the arcuate surfaces 94, 96 are shown as being symmetric about the midplane 100, this symmetry is not necessary and may not be present in alternative embodiments of the mounting platform 14.

In the front elevation view of the mounting platform 14 of FIG. 13 the arcuate surfaces 94, 96 are symmetric about a midplane 102 and subtend an angle α. The actual value of the angle α will depend upon the design constraints of the particular installation. A value of α of about 30 degrees has proven useful. The arcuate surfaces 94, 96 have a radius $R_2$ when viewed from the front. It will be appreciated that although the arcuate surfaces 94, 96 are shown as being symmetric about the midplane 102, this symmetry is not necessary and may not be present in alternative embodiments of the mounting platform 14. The radii $R_1$, $R_2$ may or may not be equal.

Figure 11:
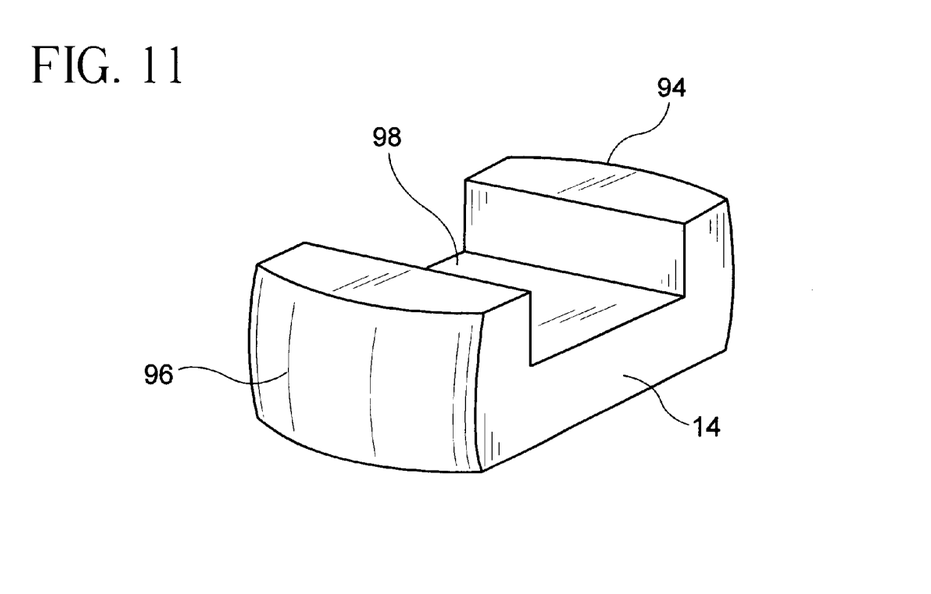
FIG. 11 is a perspective view of an alternative embodiment of the mounting platform of the present invention.

Returning to FIG. 10, the mounting surface 98 is configured to allow the optical element 11 to be coupled to the mounting platform 14. The mounting surface 98 may be coplanar with the top of the mounting platform 14 or may be offset, such as, for example the recessed mounting surface depicted in FIG. 11. Additionally, the mounting surface 98 may include grooves, such as V-grooves or U-grooves for the mounting of the optical element 11. The optical element 11 may be coupled to the mounting platform 14 by adhesive bonding, brazing, clamping, mechanical fastening, soldering or welding. In one embodiment of the present invention, the mounting surface 98 is disposed so that the optical axis of the optical element 11 runs through the co-located points A, B, C shown in FIGS. 2, 3 and 4. Additionally, the centers of curvature of the arcuate surfaces 94, 96 coincide with the co-located points A, B, C shown in FIGS. 2, 3 and 4.

Figure 14:
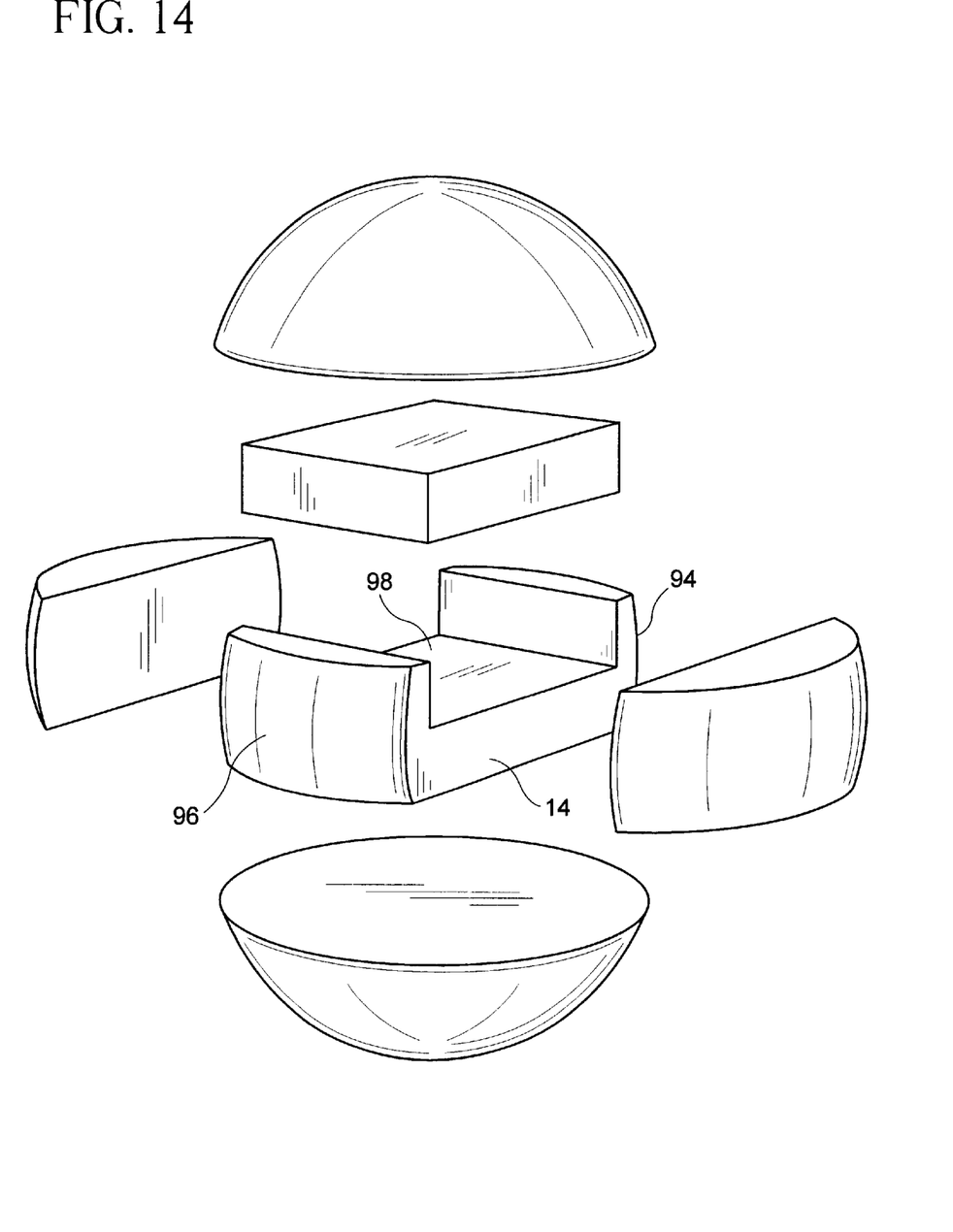
FIG. 14 is a perspective view of how to remove material from a sphere to make the mounting platform of FIG. 11.
Figure 15:
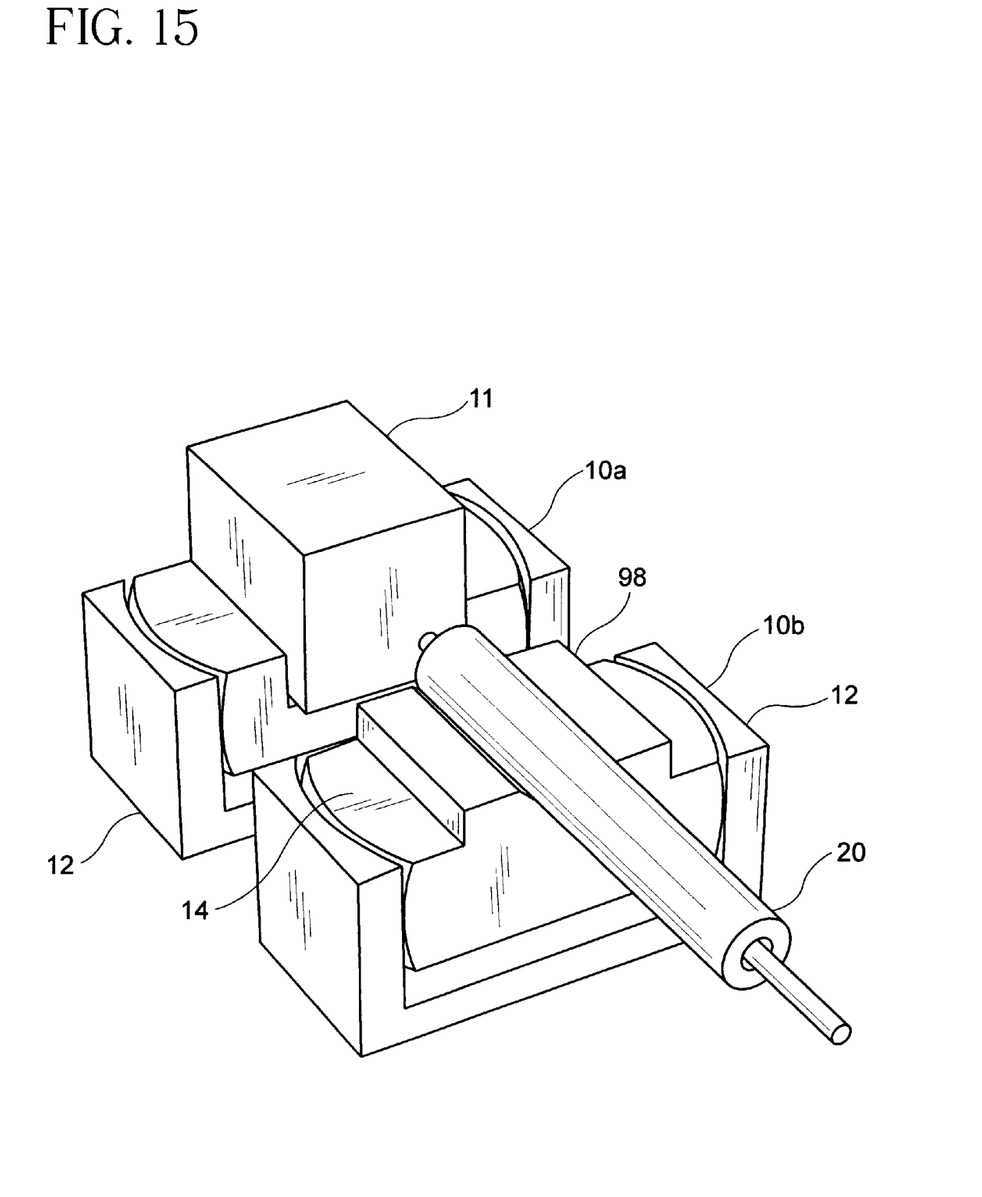
FIG. 15 is a perspective view of two positioners in which the present invention is embodied.

The mounting platform 14 may be made selectively removing material from a sphere. Precision spherical bearings that are readily available from a number of commercial suppliers have proven suitable for fabricating into mounting platforms 18. FIG. 14 illustrates where material may be removed from a precision spherical bearing in order to form a mounting platform 14. Preferably material is removed to form a mounting platform 14 having two arcuate surfaces 94, 96 opposite one another.

The mounting platform 14 may be coupled to the base 12 using an adhesive. An adhesive bond is formed between the arcuate surfaces 94, 96 of the mounting platform 14 and the arcuate surfaces 30, 32 of the base 12. The adhesive may be placed before placing the mounting platform 14 in the receptacle 22 or may be applied using capillary flow between the arcuate surfaces 30, 32 and the arcuate surfaces 94, 96 after the optical element is positioned. Suitable adhesives include, for example, adhesives in which curing is optically initiated, ultraviolet curable adhesives, thermal curing adhesives and time curing epoxies.

Alternatively, the mounting platform 14 may be coupled to the base 12 by brazing, soldering or welding, such as, for example, laser welding.

The base 12 is coupled to the flat surface that the planar surface 16 is slidable upon. The base 12 may be coupled to the flat surface by brazing, welding or adhesive bonding. Preferably the base 12 is welded to the surface using a laser.

Figure 2:
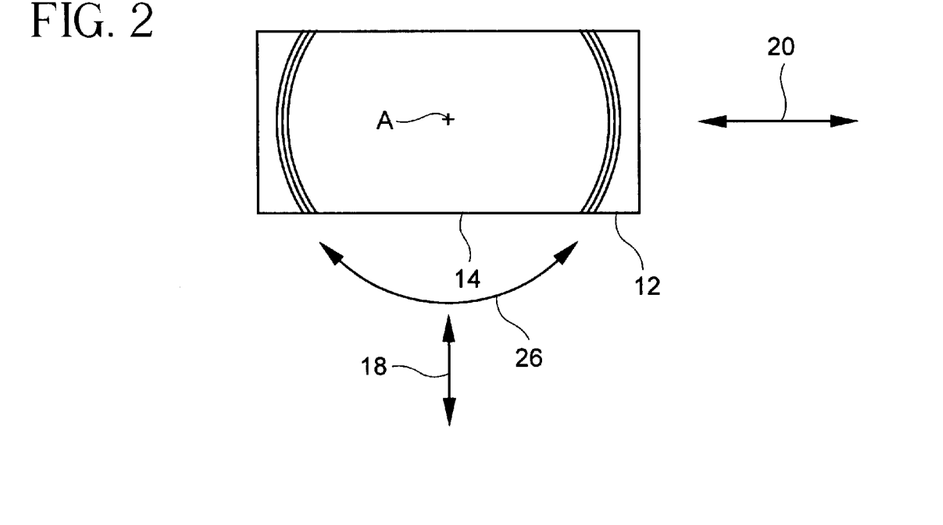
FIG. 2 is a top plan view of the positioner shown in FIG. 1.
Figure 4:
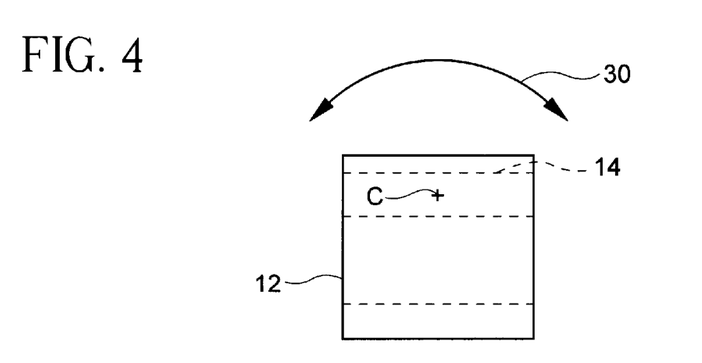
FIG. 4 is a side elevation view of the positioner shown in FIG. 1
Figure 6:
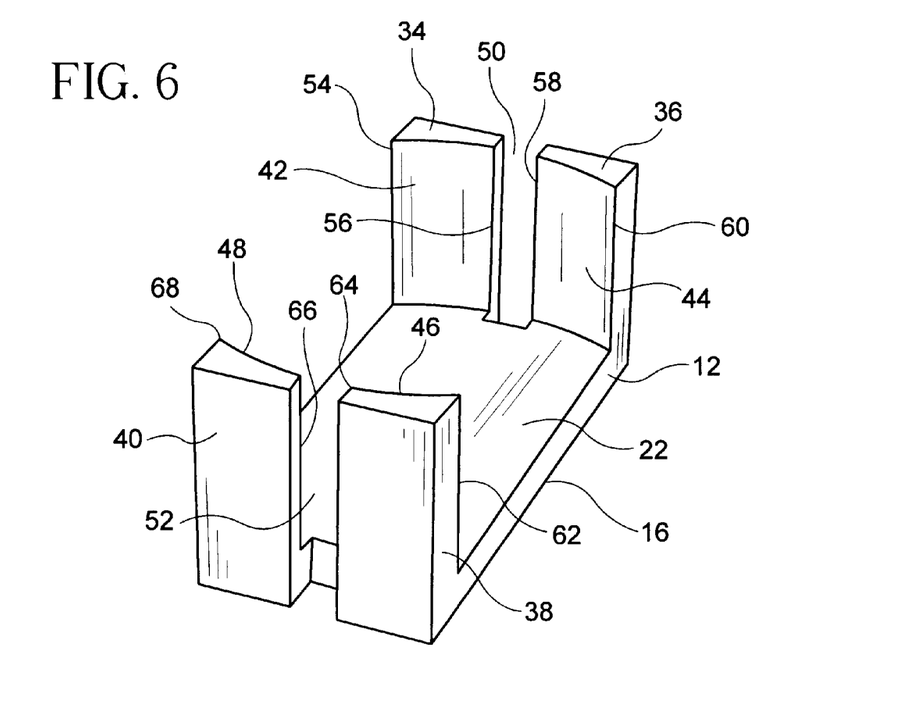
FIG. 6 is a perspective view of an alternative embodiment of the base of the present invention.

In an alternate embodiment, as embodied herein and shown in FIG. 6, the base 12 includes planar surface 16 configured for slidable engagement with a flat surface, such as, for example the surface of an optical platform (not shown) and four vertical members 34, 36, 38, 40. Each of the four vertical members 34, 36, 38, 40 includes an arcuate surface 42, 44, 46, 48. The arcuate surfaces 42, 44, 46, 48 define a receptacle 22. Preferably all four arcuate surfaces 42, 44, 46, 48 have the same radius of curvature. The arcuate surfaces 42, 44, 46, 48 engage the arcuate surfaces 94, 96 of the mounting platform 14. The receptacle 22 constrains the mounting platform 14 to reciprocal lineal motion along a single axis within receptacle 22. Thus the mounting platform 14 is allowed to move in a direction transverse to the plan of the surface 16, thereby adding another degree of translational freedom. While allowing the mounting platform 14 to rotate about three (3) orthogonal axes (as shown in FIGS. 2, 3 and 4). The base 12 also includes two slots 50, 52 defined by adjacent vertical members 34, 36, 38, 40. The slots 50, 52 allow the laser welding of the base 12 to the mounting platform 14 after positioning the optical element 11. When the base 12 and the mounting platform 14 are made of steel, for example AISI 316 stainless steel, the mounting platform 14 may be welded to the base 12 using a 50 Watt Nd:YAG laser having a spot size of 300 μm. The duration of the lasing is about 3 milliseconds. Typically the welds are formed along the edges 56, 58, 64, 66 of the vertical members 34, 36, 38, 40. The base and mounting platform may also be made of any laser weldable alloy, such as, for example Kovar, AISI 304 stainless steel, Nickel or Invar.

Alternatively, the mounting platform 14 may be coupled to the base 12 using an adhesive. An adhesive bond is formed between the arcuate surfaces 94, 96 of the mounting platform 14 and the arcuate surfaces 42, 44, 46, 48 of the base 12. The adhesive may be placed before placing the mounting platform 14 in the receptacle 22 or may be applied using capillary flow between the arcuate surfaces 42, 44, 46, 48 and the arcuate surfaces 94, 96 after the optical element is positioned. Suitable adhesives include, for example, adhesives in which curing is optically initiated, ultraviolet curable adhesives, thermal curing adhesives and time curing epoxies.

Figure 7:
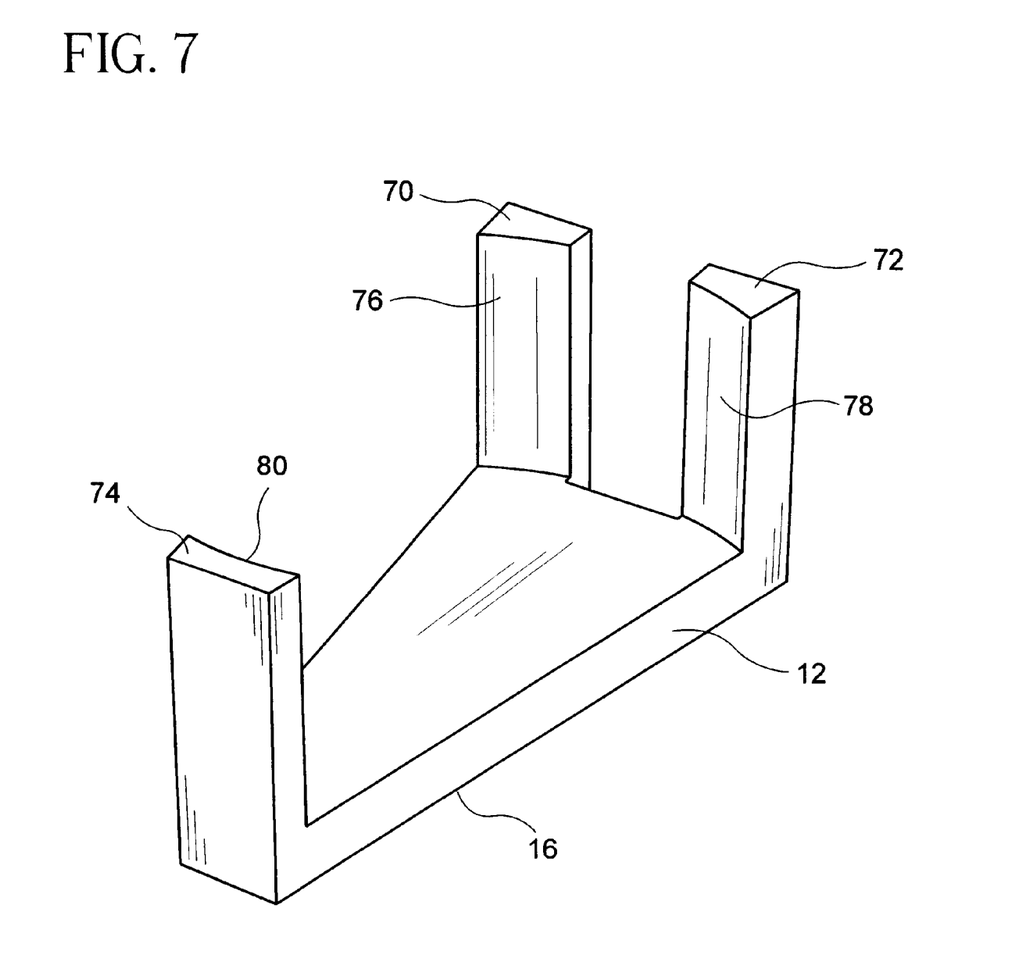
FIG. 7 is a perspective view of an alternative embodiment of the base of the present invention.

In an alternate embodiment of the invention, as embodied herein and shown in FIG. 7, the base 12 has three vertical members 70, 72, 74 arranged in a triangular pattern. Each of the vertical members 70, 72, 74 has an arcuate surface 76, 78, 80. The arcuate surfaces 76, 78, 80 act in conjunction to define the receptacle 22 for the mounting platform 14. Preferably the arcuate surfaces 76, 78, 80 all have the same radius of curvature and if extended until they contacted one another would define a cylindrical volume having a longitudinal axis perpendicular to the planar surface 16.

Figure 8:
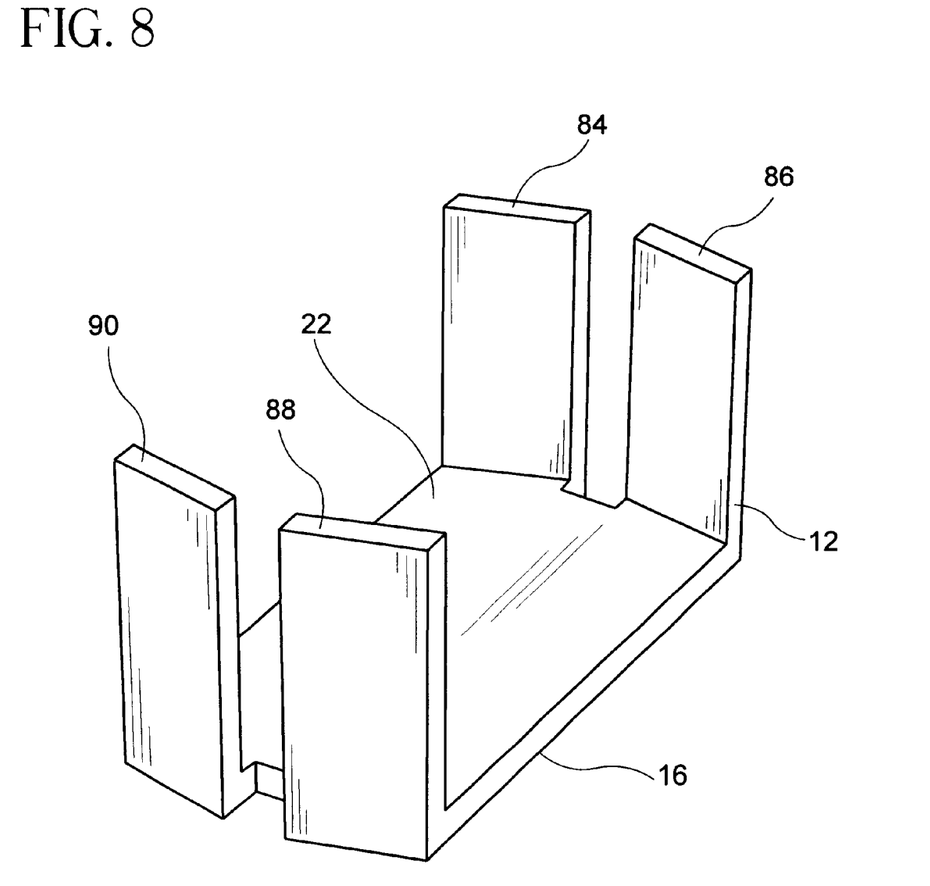
FIG. 8 is a is a perspective view of an alternative embodiment of the base of the present invention.
Figure 9:
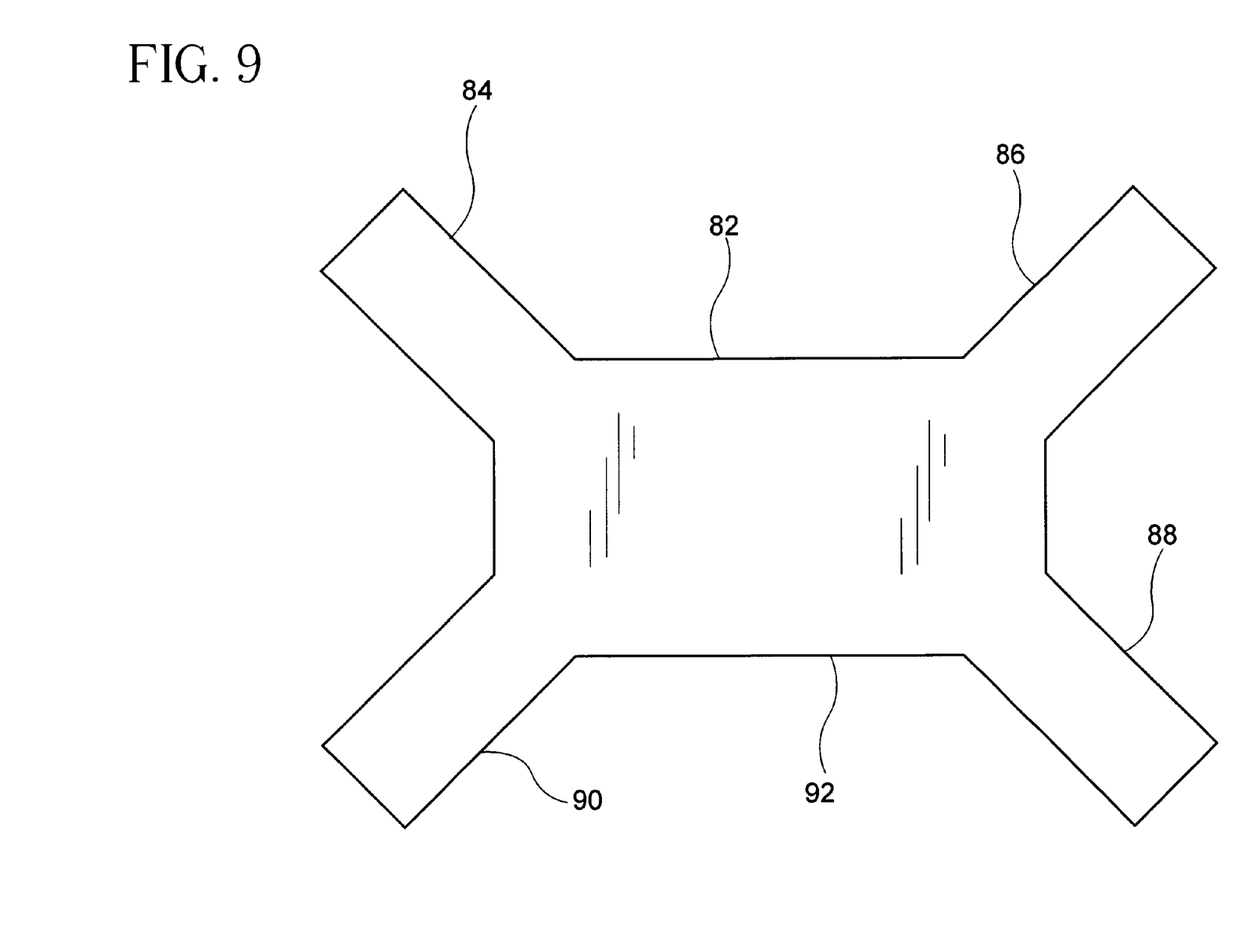
FIG. 9 is a top plan view of the flat pattern of the base shown in FIG. 8.

In an alternate embodiment, as embodied herein and shown in FIG. 8, the base 12 is formed from a metallic sheet. FIG. 9 shows once possible flat pattern 82 for the metallic sheet. The flat pattern 82 includes four legs 84, 86, 88, 90 arranged around a central portion 92. To form the base 12 the four legs 84, 86, 88, 90 are bent in same direction thereby forming a receptacle for a mounting platform 14. Returning to FIG. 8, after bending each of the four legs 84, 86, 88, 90 is substantially perpendicular to the central portion 92. It will be apparent to those of ordinary skill in the pertinent art that modifications and variations can be made to the embodiment of the base 12 shown in FIG. 8 and FIG. 9. The base 12, for example, may be made with as few as three folded legs or as many as required by the prevailing design conditions.

It will be apparent to those of ordinary skill in the pertinent art that modifications and variations can be made to the base 12 of the present invention. Turning to FIG. 6 for example, the vertical members 34, 36, 38, 40 may be replaced by four cylindrical post that would capture the mounting platform 14 between them. Similarly, with regard to FIG. 7, the three vertical members and their respective arcuate surfaces may be replaced by 3 cylindrical post that would capture the mounting platform 14 between them. The limiting design consideration for the configuration of the receptacle 16 is that a mounting platform 14 placed in the receptacle 22 is limited to reciprocal lineal motion along a single axis while still maintaining freedom to rotate about three orthogonal axes.

As embodied herein and depicted in FIGS. 2, 3 and 4 the mounting platform 14 is capable of moving with four (4) degrees of freedom within the receptacle 16. With regard to FIG. 2, the mounting platform 14 is configured to rotate about the point A as indicated by the arrow 26. Turning to FIG. 3, the mounting platform 14 is configured to be slidably engageable with the receptacle 16 thus allowing bi-directional translation of the mounting platform 14 within the receptacle 16 as indicated by the arrow 24. Additionally, the mounting platform 14 is configured to be rotatable about point B as indicated by the arrow 28. As shown in FIG. 4, the mounting platform 14 is configured to be rotatable about point C as indicated by the arrow 30. The three rotations indicated by the arrows 26, 28, 30 are about three (3) orthogonal axes. Preferably, but not necessarily, the points A, B, and C are co-located. When the points A, B, and C are co-located rotations about each of the three orthogonal axes are decoupled from one another. Thus the mounting platform 14 possesses four degrees of positional freedom independent from the two translational degrees of positional freedom previously discussed. An optical element 11 coupled to the mounting platform 14 may therefore be positioned using all six degrees of freedom.

FIG. 13 shows an arrangement in which two positioners 10a, 10b are used to align the optical axis of an optical waveguide fiber 104 with the optical axis of an optical element 11.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A positioner for an optical element comprising:
   a base having:
      a substantially planar surface slidably engageable with a substrate; and
      a receptacle; and
   a mounting platform disposed in said receptacle, wherein the optical element is coupled to said mounting platform and said mounting platform is selectively positionable to align the optical element with a second optical element and said mounting platform is constrained to translation in a direction substantially perpendicular to said substantially planar surface and is free to rotate about three orthogonal axes within the receptacle.

2. A positioner for an optical element comprising:
   a base having:
      substantially planar surface in slidable contact, with a substrate;
      a first vertical member; and
      a second vertical member, wherein said first vertical member and said second vertical member define a receptacle; and
   a mounting platform disposed in said receptacle, wherein said mounting platform is free to rotate about three orthogonal axes within the receptacle, and is selectively positionable to align the optical element with a second optical element; and
   wherein after the optical element is aligned with the second optical element said base is coupled to the substrate and said mounting platform is coupled to said base.

3. The positioner of claim 2 wherein the optical element is aligned with the second optical element by sliding the base on the substrate and moving the said mounting platform within said receptacle and then attaching said base to said substrate and said mounting platform to said base.

4. The positioner of claim 2 wherein the mounting platform includes at least one arcuate surface having a compound curvature.

5. The positioner of claim 4 wherein the at least one arcuate surface of the mounting platform is a spherical surface.

6. The positioner of claim 2 wherein after the optical element is aligned with the second optical element said base is attached to the substrate and said mounting platform is attached to said base.

7. The positioner of claim 2 wherein after the optical element is aligned with the second optical element said base is welded to the substrate and said mounting platform is welded to said base.

8. The positioner of claim 2 wherein said first vertical member having a first arcuate surface and said second vertical member having a second arcuate surface, wherein said first arcuate surface and said second arcuate surface define said receptacle.

9. The positioner of claim 8, said mounting platform having a third arcuate surface, wherein said third arcuate surface is rotationally and slidably engageable with said receptacle.

10. The positioner of claim 8 wherein said receptacle constrains said mounting platform to translational movement in a single direction.

11. A positioner for an optical element comprising:
   a base having:
      a substantially planar surface in slidable contact with a substrate;

a first concave surface; and a second concave surface, wherein said first concave surface and said second concave surface have substantially the same radius of curvature and the origins of said first concave surface and said second concave surface are substantially coincident; and a mounting platform coupled to said base supporting the optical element in a certain position, wherein said mounting platform is disposed between said first concave surface and said second concave surface, and before said mounting platform is coupled to said base and said mounting platform is constrained to translation in a single direction and is free to rotate about three orthogonal axes within the receptacle.

12. A positioner for an optical element comprising:

a base having:
   a substantially planar surface slidably engageable with a substrate;
   a first vertical member having:
      a first arcuate surface, wherein said first vertical member defines a slot;
   a second vertical member having:
      a second arcuate surface, wherein said second vertical member defines a slot; wherein said first arcuate surface and said second arcuate surface define a receptacle; and a mounting platform disposed within said receptacle having:
   a third arcuate surface slidably and rotationally engageable with said receptacle, wherein said mounting platform is free to rotate about three orthogonal axes within the receptacle, and is selectively positionable;

wherein the optical element is positioned by translating and rotating said mounting platform and sliding said base on said substrate and then coupling said mounting platform to said base and said base to the substrate.

13. A positioner for an optical element comprising:

a base slidably moveable on a surface, the base having a substantially cylindrical receptacle; and a mounting platform disposed within said receptacle, the mounting platform having an arcuate surface;

wherein said mounting platform is free to rotate about three orthogonal axes within the receptacle, and is selectively positionable within said receptacle;

wherein the optical element is coupled to said mounting platform and is positioned by translating and rotating said mounting platform and sliding said base on the substrate and then coupling said mounting platform to said base and said base to the substrate.

14. The positioner of claim 13 wherein said mounting platform is coupled to said base.

15. The positioner of claim 14 wherein said mounting platform is welded to said base.

16. The positioner of claim 15 wherein said mounting platform is welded to said base using a laser.

17. A method for positioning an optical element comprising the steps of:

providing an optical element, the optical element having an optical axis;
providing a mounting platform;
coupling the optical element to the mounting platform;
providing a base, said base having a receptacle;
placing the mounting platform in the receptacle, the mounting platform being free to rotate about three orthogonal axes within the receptacle, thereby forming an assembly;

placing the assembly on a surface;
aligning the optical element in accordance with a predetermined criteria
coupling the assembly to the surface; and
coupling the mounting platform to the base;
wherein the step of aligning includes the steps of translating the assembly along the surface, translating the mounting platform within the receptacle and rotating the mounting platform within the receptacle.

18. The method of claim 17 wherein the step of aligning includes aligning the optical axis with a second optical axis.

19. The method of claim 18 wherein the step of translating the assembly along the surface includes translating the assembly in a direction parallel to the second optical axis.

20. The method of claim 19 wherein the step of translating the assembly along the surface includes translating the assembly in a direction perpendicular to the second optical axis.

21. The method of claim 20 wherein the step of rotating includes rotating the mounting platform about two orthogonal axes.

22. The method of claim 20 wherein the step of rotating includes rotating the mounting platform about three orthogonal axes.

23. The method of claim 18 wherein the step of rotating includes rotating the mounting platform about three orthogonal axes.

24. The method of claim 17 wherein the mounting platform includes at least one arcuate surface having a compound curvature.

25. The method of claim 24 wherein the at least one arcuate surface of the mounting platform is a spherical surface.

26. An optical device comprising:

a substrate having a surface;
a first optical element coupled to said substrate;
a base disposed on said surface, said base having:
   two vertical members defining a receptacle, said receptacle having a longitudinal axis, wherein said longitudinal axis is inclined with respect to said surface;
   a mounting platform disposed in said receptacle, the mounting platform being free to rotate about three orthogonal axes within the receptacle; and
   a second optical element coupled to said mounting platform;
wherein, said receptacle constrains said mounting platform to reciprocal lineal motion along the longitudinal axis of the receptacle.

27. A method for aligning optical elements comprising the steps of:

selecting a first optical element;
selecting a mounting platform;
coupling said first optical element to said mounting platform;
selecting a base having a receptacle;
placing said mounting platform in said receptacle, the mounting platform being free to rotate about three orthogonal axes within the receptacle, thereby forming an optical positioner;
selecting an optical platform;
selecting a second optical element;
coupling said second optical element to said optical platform;
placing said optical positioner proximate to said second optical element;

aligning said first optical element and said second optical element;

coupling said base to said optical platform; and coupling said mounting platform to said base.

28. The method of claim 27 wherein the step of aligning includes the steps of:

moving said base with respect to said second optical element;

rotating said mounting platform; and moving said mounting platform linearly with respect to said base.

29. The method of claim 27 wherein the step of aligning includes the steps of:

moving said base in a plane;

moving said mounting platform perpendicular to said plane; and rotating said mounting platform.

30. The method of claim 29 wherein the step of rotating includes: rotating said mounting platform about three orthogonal axes.

31. An optical device made according to the method of claim 30.

32. An optical device made according to the method of claim 27.

33. A method for positioning an optical element comprising the steps of:

providing an optical element, the optical element having an optical axis;

providing a mounting platform;

coupling the optical element to the mounting platform;

providing a base, said base having a receptacle;

placing the mounting platform in the receptacle, the mounting platform being free to rotate about three orthogonal axes within the receptacle, thereby forming an assembly;

placing the assembly on a surface;

aligning the optical element in accordance with a predetermined criteria coupling the assembly to the surface; and coupling the mounting platform to the base;

wherein the step of aligning includes the steps of translating the assembly along the surface, translating the mounting platform within the receptacle and rotating the mounting platform within the receptacle.

34. The method of claim 33 wherein the step of coupling the mounting platform to the base is performed before the step of coupling the assembly to the surface.

35. The method of claim 33 wherein the step of aligning includes aligning the optical axis with a second optical axis.

36. The method of claim 35 wherein the step of translating the assembly along the surface includes translating the assembly in a direction parallel to the second optical axis.

37. The method of claim 36 wherein the step of translating the assembly along the surface includes translating the assembly in a direction perpendicular to the second optical axis.

38. The method of claim 37 wherein the step of rotating includes rotating the mounting platform about two orthogonal axes.

39. The method of claim 37 wherein the step of rotating includes rotating the mounting platform about three orthogonal axes.

40. The method of claim 35 wherein the step of rotating includes rotating the mounting platform about three orthogonal axes.

* * * * *